United States Patent
Bowman

(10) Patent No.: US 6,370,172 B1
(45) Date of Patent: Apr. 9, 2002

(54) NON-EXOTHERMIC QUASI-TWO LEVEL LASER

(75) Inventor: Steven R. Bowman, Davidsonville, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/472,012

(22) Filed: Dec. 27, 1999

(51) Int. Cl.$^7$ .............................. H01S 3/04; H01S 3/16; H01S 3/17; H01S 3/091

(52) U.S. Cl. .............................. 372/34; 372/40; 372/41; 372/70

(58) Field of Search ........................... 372/34, 70, 105, 372/39–41

(56) References Cited

U.S. PATENT DOCUMENTS 5,287,378 A * 2/1994 Bowman et al. .............. 372/68

OTHER PUBLICATIONS

Bowman, "Lasers Without Internal Heat Generation.", IEEE Journal of Quantum Electronics, vol. 35 No. 1, Jan. 1999, pp. 115–122.*

Epstein et al., "Observation of Laser Induced Fluorescent Cooling of a Solid.", Nature, vol. 377 Iss. 6549, Oct. 1995, pp. 500–503.*

Djeu et al., "LaserCooling by Spontaneous Anti–Stokes Scattering.", Physical Review Letters, vol. 46 No. 4, Jan. 1981, pp. 236–239.*

"Observation of Laser–Induced Fluorescent Cooling of a Solid", pp. 500–503, Nature, Oct. 12, 1995.

* cited by examiner

Primary Examiner—James W. Davie
Assistant Examiner—James Menefee
(74) Attorney, Agent, or Firm—John J. Karasek; Jane B. Barrow

(57) ABSTRACT

A method for selecting laser and pump frequencies for a quasi-two level solid state laser with a selected laser host and operating the laser with the selected laser and pump frequencies, the host having a fluorescence probablility $P(v)$ over a frequency range from $v_i$ to $v_f$, has the steps: (a) determining for the laser host, a power weighted average fluorescence frequency $<v_F>$ given by $$\langle v_F \rangle = \frac{1}{(v_f - v_i)} \int_{v_i}^{v_f} v \cdot P(v) \, dv;$$

(b) selecting an output frequency $v_L$ for the quasi-two level solid state laser to satisfy the expression $v_L << <v_F>$, and tuning the laser for laser emission at the $v_L$; and (c) selecting a pump frequency $v_P$ for the quasi-two level solid state laser to satisfy the expression $v_L < v_P << <v_F>$, and optically pumping the laser host with a laser pump to produce laser emission at the $v_L$. This invention will provide athermal laser operation.

3 Claims, 3 Drawing Sheets

NON-EXOTHERMIC QUASI-TWO LEVEL LASER

BACKGROUND OF THE INVENTION

1. Field of the Invention

The present invention relates generally to solid state lasers, and more particularly to quasi-two level lasers operating without excess heat generation.

2. Description of the Related Art

Conventional solid state lasers convert a portion of the pump energy into excess heat within the laser medium. This excess heat builds up inside the laser medium, typically resulting in a loss of beam quality due to distortions in the medium. If the solid state laser is pumped too hard, the laser medium typically will overheat to the point of failure (cracking). To combat this problem, cooling systems have been added to solid state laser systems, undesirably adding to the size and energy requirements of the lasers. Unfortunately, even powerful cooling systems typically will not be effective for larger laser media, given the limited thermal conductivity of many laser media.

SUMMARY OF THE INVENTION

Accordingly, it is an object of this invention to provide heat-balanced (sometimes referred to herein as radiation balanced), non-exothermic solid state lasers.

It is a further object of this invention to provide a method for selecting pumping and lasing frequencies for lasers, so that such lasers operate in such a non-exothermic manner.

It is a further object of the invention to provide uncooled laser operation in a solid state laser.

These and additional objects of the invention are accomplished by the structures and processes hereinafter described.

An aspect of the present invention is a quasi-two level solid state laser having: (a) a laser cavity defined by a first mirror and an opposing second mirror, where the mirrors are at least partially reflective at a selected output frequency $v_L$; (b) a laser medium disposed in the laser cavity, consisting essentially of a host material, doped with an amount of quasi-two level laser ions sufficient to produce a longitudinal mode laser emission from the transition of the quasi-two level laser ions from the excited state to the ground state when the laser medium is pumped by a laser pump, where the laser medium has a fluorescence probability $P(v)$ over a frequency range from $v_i$ to $v_f$, and where the laser medium has a power weighted average fluorescence frequency $\langle v_F \rangle$ given by $$\langle v_F \rangle = \frac{1}{(v_f - v_i)} \int_{v_i}^{v_f} v \cdot P(v) dv; \qquad (1)$$

and (c) a laser pump for the laser medium, optically coupled to the laser medium, the laser pump having a pump frequency $v_P$, where $$\langle v_F \rangle > v_P > v_L \qquad (2)$$

Another aspect of the present invention is a method for selecting laser and pump frequencies for a quasi-two level solid state laser with a selected laser host and operating the laser with the selected laser and pump frequencies, the host having a fluorescence probability $P(v)$ over a frequency range from $v_i$ to $v_f$, the method having the steps: (a) determining for the laser host, a power weighted average fluorescence frequency $\langle v_F \rangle$ given by equation (1); (b) selecting an output frequency $v_L$ for the quasi-two level solid state laser to satisfy the expression $v_L \ll \langle v_F \rangle$, and tuning the laser for laser emission at the $v_L$; and (c) selecting a pump frequency $v_P$ for the quasi-two level solid state laser to satisfy the expression $v_L < v_P \ll \langle v_F \rangle$, and optically pumping the laser host with a laser pump to produce laser emission at the $v_L$.

BRIEF DESCRIPTION OF THE DRAWINGS

A more complete appreciation of the invention will be obtained readily by reference to the following Description of the Preferred Embodiments and the accompanying drawings in which like numerals in different figures represent the same structures or elements, wherein.

DETAILED DESCRIPTION OF THE PREFERRED EMBODIMENTS

Steven R. Bowman, "Lasers Without Internal Heat Generation", *IEEE Journal of Quantum Electronics* 35(1) pp. 115–21 (December 1998), is incorporated by reference herein, in its entirety, for all purposes.

Heat Balance Generally

Figure 1:
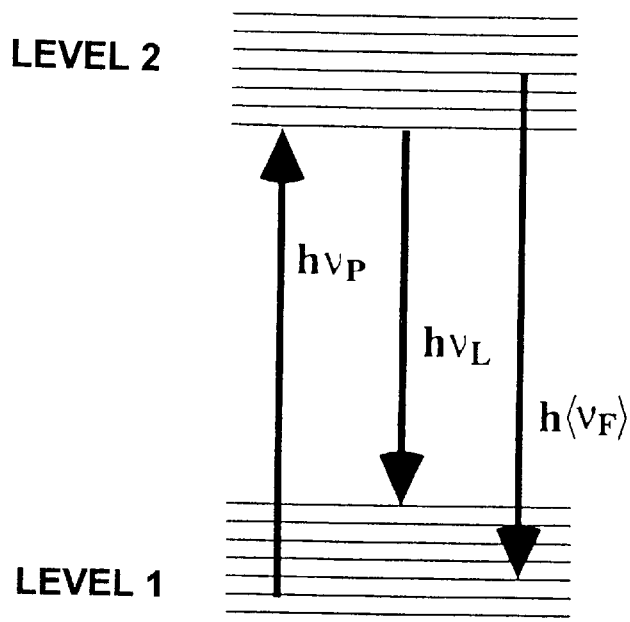
FIG. 1 is an energy level diagram for the relevant energy transitions for an exemplary quasi-two level solid state laser according to the invention.

Referring to FIG. 1, a quasi-two level laser is a laser having two energy levels (depicted here generically as Level 1 and Level 2), where both the pumping and lasing transitions occur between these two levels. To obtain the population inversion necessary for laser operation, it is necessary for these two levels to be broadened by the thermal energy kT. Since the levels are so broadened, the name quasi-two level has been adopted to describe these lasers. As one may see, such quasi-two level systems typically have broad overlaps between the absorption and fluorescence spectra. This overlap is key to the present invention, as will be seen below.

Solid state laser emission is inherently an exothermic process, resulting in heat buildup within the laser medium. Considering for example the quasi-two level laser shown in FIG. 3, one sees that $hv_P > hv_L$. The difference between the pump transition energy and the lasing transition energy, $h(v_P - hv_L)$, is deposited throughout the laser medium at each dopant ion, with each lasing cycle of each electron. This energy difference is deposited as heat in the laser medium.

In contrast, fluorescence is an endothermic process in solid state laser media. See R. I. Epstein et al., "Observation of laser-induced fluorescent cooling of a solid", *Nature* 377, pp. 500–03 (1995), incorporated by reference herein, in its entirety, for all purposes. Accordingly, the difference between the pump transition energy and the weighted average fluorescence transition energy $h(\langle v_F \rangle - v_P)$, on average with each lasing cycle of each electron, must come from the laser medium in the vicinity of each dopant ion.

The basic premise of the invention is to balance, at each volume element within the laser, the fluorescence cooling and the laser beating. To put this another way, the absorbed power density in any volume element in the laser equals the radiated power density, or (Pump Rate)·$h\nu_P$=(Stim. Emission Rate)·$h\nu_L$+(Spontaneous Emission Rate)·$h\langle\nu_F\rangle$     (3)

or $$\sigma_P I_P [f_1 N_1 - f_2 N_2] = \sigma_L I_L [g_2 N_2 - g_1 N_1] + \frac{h\langle\nu_F\rangle N_2}{\tau} \quad (4)$$

where $I_P$ and $I_L$ are the pump and laser intensities within the lasing medium, $\sigma_P$ and $\sigma_L$ are the cross-sect at the pump and lasing frequencies, $\tau$ is the lifetime of level 2, $N_1$ is the density of dopant ions in state 1, $N_2$ is the density of dopant ions in state 2, so that their sum $N_1+N_2=N_T$, the total dopant ion density, and $f_i$ and $g_i$ are the Boltzmann probabilities of an atom being in the ith sublevel that contributes to the pump or lasing transition, respectively. The Boltzmann probabilities are given by:

$$g_1(T) = \frac{\exp\left[\frac{(-\varepsilon_{L1})}{kT}\right]}{\sum_j^{level\,1} \exp\left[\frac{(-\varepsilon_{1j})}{kT}\right]}, \quad (5)$$

$$g_2(T) = \frac{\exp\left[\frac{(\varepsilon_2 - \varepsilon_{L2})}{kT}\right]}{\sum_i^{level\,2} \exp\left[\frac{(\varepsilon_2 - \varepsilon_{2i})}{kT}\right]} \text{ and} \quad (6)$$

$$f_1(T) = \frac{\exp\left[\frac{(-\varepsilon_{P1})}{kT}\right]}{\sum_j^{level\,2} \exp\left[\frac{(-\varepsilon_{1j})}{kT}\right]}, \quad (7)$$

$$f_2(T) = \frac{\exp\left[\frac{(\varepsilon_2 - \varepsilon_{P1})}{kT}\right]}{\sum_i^{level\,2} \exp\left[\frac{(\varepsilon_2 - \varepsilon_{2i})}{kT}\right]}. \quad (8)$$

The inventors have determined that the fundamental relation for a heat balanced laser is:

$$\frac{\langle W_L\rangle}{(\nu_F - \nu_P)} = \frac{\langle N_2\rangle}{(\nu_P - \nu_L)\tau} = \frac{\langle W_P\rangle}{(\nu_F - \nu_L)}. \quad (9)$$

where $\langle W_L\rangle$, $\langle N_2\rangle$, and $\langle W_P\rangle$ are the time averaged laser field power, Level 2 density, and pump field power, respectively.

For cw lasing, combining equations (2) and (4), and solving for the steady state upper level density $N_2$ and the laser intensity $I_L$ as functions of the pump intensity yields $$N_2 = \frac{f_1 N_T}{(f_1 + f_2)}\left(\frac{I_P}{I_P + I_{Psat}}\right) \text{ and} \quad (10)$$

$$I_L = I_{Lsat} f_1(g_1 + g_2) \frac{I_P}{(f_1 g_2 - f_2 g_1) I_P - g_1(f_1 + f_2) I_{Psat}} \quad (11)$$

where $I_{Psat}$ and $I_{Lsat}$ are saturation intensities for the pump and laser fields defined as:

$$I_{Psat} = \frac{h\nu_P}{\sigma_P \tau (f_1 + f_2)}\left(\frac{\langle\nu_F\rangle - \nu_L}{\nu_P - \nu_L}\right) \text{ and} \quad (12)$$

$$I_{Lsat} = \frac{h\nu_L}{\sigma_L \tau (g_1 + g_2)}\left(\frac{\langle\nu_F\rangle - \nu_P}{\nu_P - \nu_L}\right). \quad (13)$$

Since the system is required to have a gain at $\nu_L$, this implies a minimum pump intensity. Likewise, pump saturation and radiation balance imply a minimum laser intensity. From the expressions for $N_2$ and $I_L$, these minimum pump and laser intensities are, respectively:

$$I_{Pmin} = \left(\frac{g_1(T)\cdot(f_1(T)+f_2(T))}{g_1(T)\cdot f_2(T) - g_2(T)\cdot f_1(T)}\right)\cdot I_{Psat} \text{ and} \quad (14)$$

$$I_{Lmin} = \left(\frac{f_1(T)\cdot(g_1(T)+g_2(T))}{f_1(T)\cdot g_2(T) - f_2(T)\cdot g_1(T)}\right)\cdot I_{Lsat}. \quad (15)$$

These minimum intensities are useful figures of merit for selecting materials and operating frequencies for a heat balanced laser.

It should be noted that while complete heat-balanced operation at every volume element within the laser medium is considered to be preferred for the present invention, it is not considered to be necessary for the invention. Likewise, heat balanced operation for the laser medium as a whole is considered to be preferred for the present invention, but it is not considered to be necessary for the invention. Small deviations from perfectly heat balanced operation, such that thermal conduction and/or convection can keep the laser medium within the desired operating temperature range at every volume element will be sufficient for the present invention.

For a given volume element, essentially heat balance operation is achieved if the following inequality (a variation of equation (3)) is satisfied:

(Pump Rate)·$h\nu_P$≦(Stim. Emission Rate)·$h\nu_L$+(Spontaneous Emission Rate)·$h\langle\nu_F\rangle$±(Steady State Heat Transfer Rate)   (16)

where the steady state heat transfer rate is sufficiently low to prevent either thermal degradation of the lasing medium or thermal distortion of the beam quality.

Consider, for instance, if the laser medium in a given volume element is slightly exothermic, e.g., the absorbed power density in the laser medium is not more than 1% greater than the radiated power density. In this case, equation (3) would no longer be satisfied, but could be recast as an inequality:

(Pump Rate)·$h\nu_P$≦1.01×[(Stim. Emission Rate)·$h\nu_L$+(Spontaneous Emission Rate)·$h\langle\nu_F\rangle$]   (17)

Such a laser could still provide essentially heat balanced operation, especially if an adjoining volume element were slightly endothermic, e.g., the absorbed power density in the laser medium is not more than 1% less than the radiated power density.

Propagation Through a Heat Balanced Laser

As the pump and laser fields propagate through the laser medium, their intensities vary. Consequently, heat balance in one unit volume of the laser medium will typically be different from the heat balance in remote unit volumes of the laser medium.

Consider, for instance, the operation of a laser amplifier according to the invention (the present invention provides heat balanced operation for both laser amplifiers and laser oscillators). Gain in a laser amplifier for longitudinal propagation along the z axis is given by:

$$\frac{\partial I_L}{\partial z} = h\nu_L \cdot W_L = \sigma_L \cdot [(g_1(T) + g_2(T)) \cdot N_2 - g_1(T) \cdot N_T] \cdot I_L. \quad (18)$$

$$= h\nu_L \cdot W_L = \sigma_L \cdot [(g_1(T) + g_2(T)) \cdot N_2 - g_1(T) \cdot N_T] \cdot I_L \quad (18)$$

Assuming this wave propagates in steady state radiation balance, one may solve for the pump intensity necessary to maintain thermal balance. The density $N_2$ can be eliminated from equation (12) using equations (5) and (6) to give $$\frac{\partial I_L}{\partial z} = \frac{\alpha_L \cdot I_{Lsat} \cdot I_L}{I_L - I_{Lsat}} \quad (19)$$

where the laser absorption coefficient $\alpha_L$ has the standard definition $\alpha_L = \sigma_L g_1(T) \cdot N_T$. The requirement of radiation balance has modified the sign in the denominator from the normal expression for saturation gain in a homogenous laser medium. Direct integration from 0 to z yields $$\frac{I_L(0)}{I_L(0)} \cdot \exp\left[\frac{I_L(z) - I_L(0)}{I_{Lsat}}\right] = \exp[\alpha_L \cdot z]. \quad (20)$$

A plane wave propagating in radiation balance must grow according to the above equation. To maintain balance for one-way propagation, the gain and pump intensities along the z axis must be varied accordingly. The pump intensity profile that will produce the preferred gain can be computed directly from equations (10) and (20).

Figure 2:
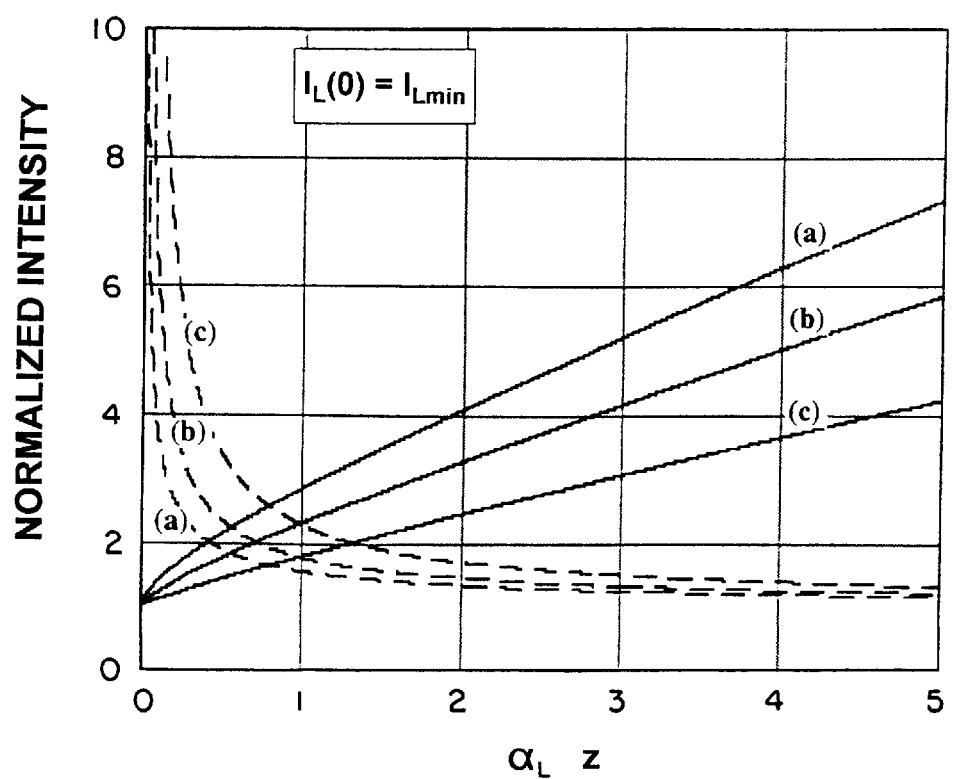
FIG. 2 is a set of superimposed plots of lasing and pump intensity profiles for heat balanced solid state lasers.

FIG. 2 plots the longitudinal pump and lasing intensity profiles for a heat balanced cw laser amplifier. The dashed lines are pump intensities for three difference conditions, and the solid lines are the corresponding laser intensities. For trace (a), $I_{Lmin}$=1.1 $I_{Lsat}$; for (b), $I_{Lmin}$=1.4 $I_{Lsat}$; for (c), $I_{Lmin}$=2.0 $I_{Lsat}$. Both the laser and pump intensities are normalized to their minimum allowed values $I_{Lmin}$ and $I_{Pmin}$.

Practical Considerations

The foregoing analysis demonstrates that a heat balanced laser according to the present invention is possible. However, practicality requires the proper selection of laser materials, and consideration of the optical design.

As a skilled practitioner will see from the foregoing analysis, non-radiative transitions in the laser material should be kept to an absolute minimum. To put this another way, the selected laser material must be as close to an ideal quasi-two level radiator as possible. Even relatively weak non-radiative transitions have the potential to disrupt the heat balance in the laser, by turning some of the power density into heat. Therefore, suitable materials according to the invention will have total non-radiative loss rates much smaller than the spontaneous emission rate:

$$W_{NR} << \frac{1}{\tau} \frac{(\langle \nu_F \rangle - \nu_P)}{\nu_P}. \quad (21)$$

The non-radiative transitions most likely, in the inventors view, to disrupt the heat balance in the lasers of the invention are concentration quenching, impurity quenching, and multiphonon quenching of the active ions.

Besides low total non-radiative loss rates, a preferred laser material according to the invention will have broad overlapping absorption and fluorescence spectra, with a strong absorption spectral feature between $\nu_L$ and $\langle \nu_F \rangle$, for effective pumping.

Once a proper laser medium is selected, however, the thermal balance of the laser means that thermal constraints are not nearly so critical as they are with conventional lasers. Cooling systems may be downsized, or eliminated entirely. Moreover, the size of the laser medium may be increased dramatically, with increases in both the aperture and the gain path, providing much grater output powers without thermally-induced birefringence, thermal distortion of the wavefront, or thermal failure of the medium. The laser medium may be made very thick along the gain and pump paths. The medium should still be relatively thin in at least one dimension, to prevent radiation trapping of the fluorescence. One sees that edge-pumped slab geometries should be ideally suited to the lasers of the invention. Likewise, edge-pumped rod geometries should work well for the present invention. End-pumping may work, but optimizing the pump field intensity curve in an end-pumped system may be a technical challenge.

A Configuration for Heat Balanced Laser

A broad range of configurations and pumping schemes are available for the lasers of the present invention. For instance, the lasers of the present invention may be side pumped or end pumped, they may be tuneable or untunable, they may be frequency doubled or undoubted. Pumping energy may be delivered to the laser medium by lenses, fibers, or configurations using both lenses and fibers.

Figure 3:
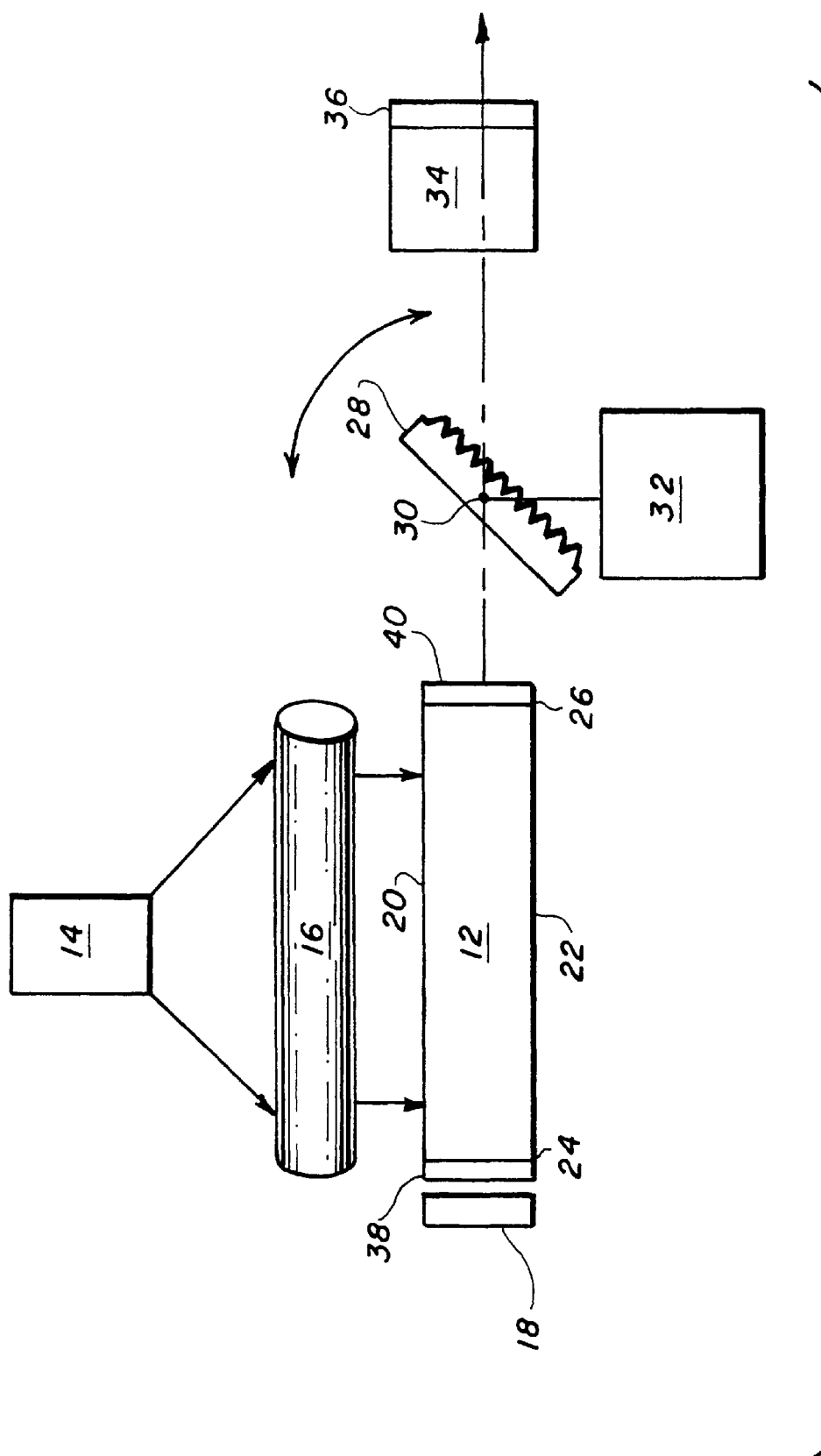
FIG. 3 is a schematic representation of an exemplary quasi-two level solid state laser according to the invention.

Referring to FIG. 3, an exemplary laser 10 includes a laser medium 12 disposed in a cavity defined by a first 18 and a second 36 opposing mirrors. A pump 14 provides pumping radiation, and is typically coupled to the medium 12 through coupling optics 16. The laser 10 may optionally include a tuning element 28. It may also optionally include a frequency doubler 34.

Figure 4:
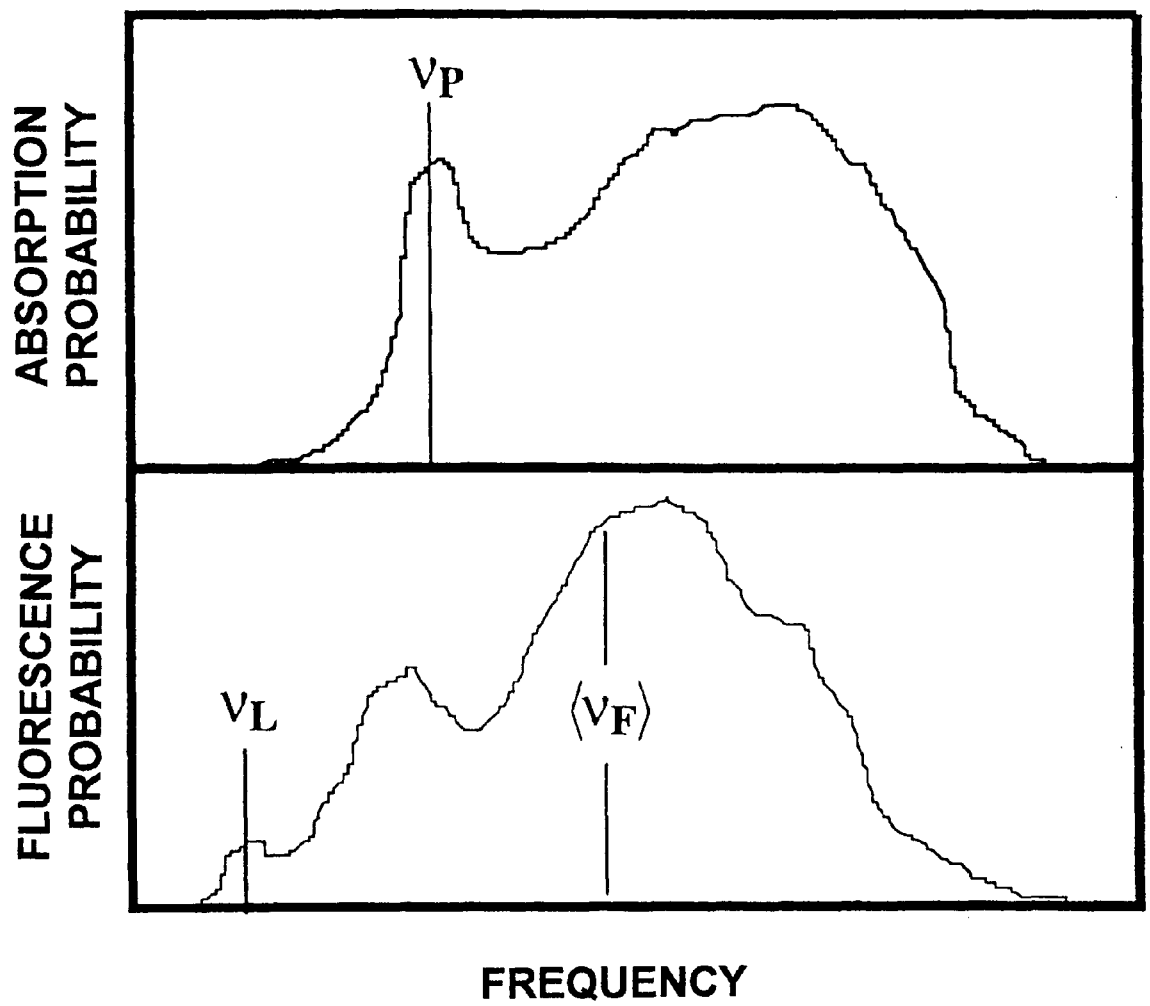
FIG. 4 is a set of superimposed plots of absorption probability and fluorescence probability versus frequency for an exemplary quasi-two level solid state laser according to the invention.

The pump 14 is preferably a laser operating in the absorption band of the laser medium (shown as the upper curve in FIG. 4).

This pumping radiation stimulates the emission of radiation from the laser medium, as shown in FIG. 1.

Referring back to FIG. 3, the pump 14 preferably directs pumping radiation into one side 20 of the medium 12. Side-pumping provides the ability to distribute pumping energy along the length of the medium 12, thus minimizing fluence. Since higher fluences are associated with greater potential for optical damage to the crystal surface, it is preferred to distribute the input of the pumping energy as much as possible. In this side-pumping embodiment, a cylindrical lens 16 typically serves as the coupling optics, to direct the pumping radiation into the medium 12.

Alternatively to side-pumping, the medium 12 is end-pumped. A laser diode array may be used for such end-pumping, as well as for side-pumping.

Preferably, the medium 12 is configured to prevent oscillation between any of the faces of the medium 12, except along the axis perpendicular to the mirrors 18,36 that define the laser cavity. In particular, in a side-pumping configuration, it is preferred to prevent oscillation between the side 20 of the medium 12 where the pumping radiation is introduced and the opposing side 22 of the medium 12. Typically, this is accomplished by making these two sides 20,22 sufficiently nonparallel that oscillation does not occur between them. A 5° angle between the sides 20,22 typically is sufficient. The ends 24,26 of the medium 12 which lie along the axis perpendicular to the mirrors 18,36 preferably are flat and parallel to each other and the mirrors 18,36.

In a side-pumping configuration, a longer crystal will permit the use of a lower input power density (i.e., fluence) to achieve a given total input power. Accordingly, it is preferred to use the longest crystal length that can be made with high quality and reasonable cost and is sufficient to achieve the power output required for the desired application.

Frequency doubling, if desired, typically is achieved using a frequency doubling crystal 34. Most preferably, this crystal 34 is disposed intracavity, as shown in FIG. 3, to take advantage of the high intracavity intensities. Alternatively, the doubling crystal is disposed outside the laser cavity or within a separate cavity. Preferred materials for doubling crystals include potassium titanyl phosphate (KTP), yttrium aluminum borate (YAB), lithium borate ($LiB_3O_5$), potassium niobate ($KNbO_3$), and lithium niobate ($LiNbO_3$).

If tuning is desired, a tuning element 28 is inserted in the cavity at Brewster's angle, between the laser medium 12 and the output mirror 36. This tuning element may be a birefringent tuning plate, a grating, or a prism. The coatings 38,40 of the laser medium 12 have sufficient bandwidth to allow tuning over the desired wavelength range.

Continuous tuning of the laser is achieved over the desired wavelength range by using a motor 32 which is operationally coupled to the tuning element 28, to rotate the tuning element about its axis 30 in either of the directions indicated by the arc. Tunability is governed by fluorescence.

Typically, the mirrors 18,36 that define the cavity will be discrete mirrors some finite distance from the ends 24,26 of the medium 12. Alternatively, one or both of the mirrors may be a reflective coating applied to the crystal. For example, the output mirror 36 may be a freestanding mirror, while the opposing mirror 18 may be a coating applied to the medium 12.

Key to the invention is selecting the appropriate laser medium and operating wavelengths, so that the condition $<v_F> > v_P > v_L$ is satisfied, as shown in FIG. 4. For this expression to be satisfied, there should be sufficient overlap between the absorption probability spectrum and the fluorescence probability spectrum that a pump frequency $v_P$ may be selected so that there is strong absorption of the pump energy by the laser medium.

Having described the invention, the following example is given to illustrate specific applications of the invention, including the best mode now known to perform the invention. This specific example is not intended to limit the scope of the invention described in this application.

PROPHETIC EXAMPLE 1

Heat Balanced Tm:YAG Laser

In view of the foregoing teachings, skilled practitioners will be able to estimate the gain, power, and efficiency of a heat balanced cw laser system. Skilled practitioners may consider a thulium-doped yttrium aluminum garnet (Tm:YAG) operating at room temperature. This material is commonly operated with high Tm densities using laser pumping into the $^3H_4$ level near 0.8 $\mu$m. However, for purposes of this prophetic example, a low Tm density crystal will be considered, with laser pumping directly into the first excited state, the $Tm^{3+}$ $^3F_4$ level, followed by lasing at 2.02 $\mu$m to the lowest electronic state, the $Tm^{3+}$ $^3H_6$ level. Under these conditions, Tm:YAG satisfies the requirement for a quasi-two level laser. From experiments at room temperature, the average fluorescence frequency corresponds to a wavelength of 1.8 $\mu$m. For heat balanced operation, then, the pump wavelength must be chosen between 1.8 $\mu$m and 2.02 $\mu$m. Using a measured absorption spectrum, choosing a strong absorption feature near 1.88 $\mu$m will be appropriate. From the known energy structure of Tm:YAG, the various Boltzmann probabilities for the important sublevels can be computed easily. At T=293 K, these probabilities are: $g_1$=0.01, $g_2$=0.47, $f_1$=0.10, and $f_2$=0.47. The hypothetical YAG crystal for this experiment is doped with 1.5 at % Tm, and is 15 cm long inside a resonator with 2% output coupling. For this laser, 2.02 $\mu$m lasing will be achieved with a pump intensity of 2.8 $kW/cm^2$. For pump intensities of 3 $kW/cm^2$, absorption efficiency is projected to be 75% and overall laser efficiency is projected to be 32%. Under these conditions, a Tm:YAG laser crystal several millimeters in diameter will produce several hundred watts of average cw laser power, an order of magnitude larger than the highest power ever achieved with this laser material. This heat balanced laser should have excellent beam quality, due to the lack of thermal distortions. Current high power thulium lasers, in contrast, have poor beam quality.

PROPHETIC EXAMPLE 2

Heat Balanced Yb:KYW and Tm:YLF Lasers

The foregoing analysis may be applied to other laser media as well. Table 1 shows the results of this analysis for Yb:KYW and Tm:YLF lasers with crystal dimensions of 1×1×10 $cm^3$.

TABLE 1

| Material | Yb: KYW | Tm: YLF |
| --- | --- | --- |
| T | 300K | 300K |
| τ | 0.6 ms | 15 ms |
| $\lambda_L$ | 1022.5 nm | 1913 nm |
| $\lambda_P$ | 998.2 nm | 1879 nm |
| $\lambda_F$ | 992.7 nm | 1821 nm |
| $g_1(T)$ | 0.085 | 0.042 |
| $g_2(T)$ | 0.75 | 0.36 |
| $f_1(T)$ | 0.27 | 0.068 |
| $f_2(T)$ | 0.75 | 0.36 |
| $\sigma_L$ | $1.8 \times 10^{-20}$ $cm^2$ | $0.68 \times 10^{-20}$ $cm^2$ |
| $\sigma_P$ | $6.6 \times 10^{-20}$ $cm^2$ | $1.6 \times 10^{-20}$ $cm^2$ |
| $I_{Psat}$ | 6.2 $kW/cm^2$ | 2.9 $kW/cm^2$ |
| $I_{Lsat}$ | 5.0 $kW/cm^2$ | 4.5 $kW/cm^2$ |
| $N_T$ | $3 \times 10^{19}$ $cm^{-3}$ | $1.4 \times 10^{19}$ $cm^{-3}$ |
| $\alpha_L$ | 0.046 $cm^{-1}$ (b pol.) | 0.039 $cm^{-1}$ ($\sigma$ pol.) |
| $\alpha_P$ | 0.528 $cm^{-1}$ (a pol.) | 0.150 $cm^{-1}$ ($\pi$ pol.) |
| $\alpha_F$ | 1.02 $cm^{-1}$ | 0.54 $cm^{-1}$ |

Obviously, many modifications and variations of the present invention are possible in light of the above teachings. It is therefore to be understood that, within the scope of the appended claims, the invention may be practiced otherwise than as specifically described.

What is claimed is:

1. A method for operating a quasi-two level solid state laser with essentially no excess heat generation, comprising:

selecting a laser medium for said solid state laser, consisting essentially of a selected host material, doped with an amount of selected quasi-two level laser ions sufficient to produce a longitudinal mode laser emission from the transition of said quasi-two level laser ions from the excited state to the ground state when said laser medium is pumped by a laser pump, wherein said laser medium has a fluorescence probablility P(v) over a frequency range from $v_i$ to $v_f$, and wherein said laser medium has a power weighted average fluorescence frequency $<v_F>$ given by $$\langle v_F \rangle = \frac{1}{(v_f - v_i)} \int_{v_i}^{v_f} v \cdot P(v) dv;$$

selecting an output frequency $v_L$ for said quasi-two level solid state laser to satisfy the expression $v_L \ll \langle v_F \rangle$, and configuring said laser for laser emission at said $v_L$;

selecting a pump frequency $v_P$ for said quasi-two level solid state laser to satisfy the expression $v_L < v_P \ll \langle v_F \rangle$;

disposing said laser medium in a resonant laser cavity; and pumping said laser medium pump frequency $v_P$, wherein $\langle v_F \rangle \gg v_P > v_L$, so that for any selected volume within the laser medium, the expression (Pump Rate)·$hv_P \leq$ (Stim. Emission Rate)·$hv_L$+(Spontaneous Emission Rate)·$h\langle v_F \rangle \pm$(Steady State Heat Transfer Rate)

is satisfied.

2. A method for operating a quasi-two level solid state laser amplifier with essentially no excess heat generation, comprising:

selecting a laser medium for said solid state laser, consisting essentially of a selected host material, doped with an amount of selected quasi-two level laser ions sufficient to produce a longitudinal mode laser emission from the transition of said quasi-two level laser ions from the excited state to the ground state when said laser medium is pumped by a laser pump, wherein said laser medium has a fluorescence probablility $P(v)$ over a frequency range from $v_i$ to $v_f$, and wherein said laser medium has a power weighted average fluorescence frequency $\langle v_F \rangle$ given by $$\langle v_F \rangle = \frac{1}{(v_f - v_i)} \int_{v_i}^{v_f} v \cdot P(v) dv;$$

selecting an output frequency $v_L$ for said quasi-two level solid state laser amplifier to satisfy the expression $v_L \ll \langle v_F \rangle$, and configuring said laser for laser emission at said $v_L$;

selecting a pump frequency $v_P$ for said quasi-two level solid state laser amplifier to satisfy the expression $v_L < v_P \ll \langle v_F \rangle$;

disposing said laser medium in a laser amplifier cavity; and pumping said laser medium pump frequency $v_P$, wherein $\langle v_F \rangle \gg v_P > v_L$, so that for any selected volume within the laser medium, the expression (Pump Rate)·$hv_P \leq$ (Stim. Emission Rate)·$hv_L$+(Spontaneous Emission Rate)·$h\langle v_F \rangle \pm$(Steady State Heat Transfer Rate)

is satisfied.

3. A method for selecting laser and pump frequencies for a quasi-two level solid state laser with a selected laser medium and operating said laser with said selected laser and pump frequencies, said medium having a fluorescence probablility $P(v)$ over a frequency range from $v_i$ to $v_f$, said method having the steps:

determining for said laser medium, a power weighted average fluorescence frequency $\langle v_F \rangle$ given by $$\langle v_F \rangle = \frac{1}{(v_f - v_i)} \int_{v_i}^{v_f} v \cdot P(v) dv;$$

selecting an output frequency $v_L$ for said quasi-two level solid state laser to satisfy the expression $v_L \ll \langle v_F \rangle$, and configuring said laser for laser emission at said $v_L$; and selecting a pump frequency $v_P$ for said quasi-two level solid state laser to satisfy the expression $v_L < v_P \ll \langle v_F \rangle$, and optically pumping said laser medium with a laser pump to produce essentially non-exothermic laser emission at said $v_L$.

\* \* \* \* \*